(12) United States Patent
Rastunkov et al.

(10) Patent No.: US 10,671,603 B2
(45) Date of Patent: Jun. 2, 2020

(54) AUTO QUERY CONSTRUCTION FOR IN-DATABASE PREDICTIVE ANALYTICS

(71) Applicant: Tibco Software Inc., Palo Alto, CA (US)

(72) Inventors: Vladimir S. Rastunkov, Tulsa, OK (US); Thomas Hill, Tulsa, OK (US); George R. Butler, Tulsa, OK (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 489 days.

(21) Appl. No.: 15/067,643

(22) Filed: Mar. 11, 2016

(65) Prior Publication Data

US 2017/0262502 A1    Sep. 14, 2017

(51) Int. Cl.
*G06F 16/00* (2019.01)
*G06F 16/2452* (2019.01)
*G06F 16/2453* (2019.01)
*G06F 16/2458* (2019.01)
*G06N 20/00* (2019.01)
*G06F 17/18* (2006.01)
(Continued)

(52) U.S. Cl.
CPC ...... *G06F 16/2452* (2019.01); *G06F 16/2458* (2019.01); *G06F 16/24534* (2019.01); *G06F 16/24537* (2019.01); *G06N 20/00* (2019.01); *G06F 16/245* (2019.01); *G06F 16/248* (2019.01); *G06F 17/18* (2013.01); *G06F 17/2818* (2013.01)

(58) Field of Classification Search
CPC ......... G06F 17/30312; G06F 17/30454; G06F 17/30533; G06F 17/30448; G06F 17/30445; G06F 17/30442; G06F 17/30389; G06F 17/30386; G06F 17/30286; G06N 7/005
See application file for complete search history.

(56) References Cited

U.S. PATENT DOCUMENTS 7,249,048 B1 *  7/2007  O'Flaherty ........ G06Q 10/0633
                                                705/7.27
8,838,654 B1 *  9/2014  Hannah ................. G06F 16/212
                                                707/803
(Continued)

OTHER PUBLICATIONS

List of Patents or Applications Treated as Related.
(Continued)

*Primary Examiner* — Diedra McQuitery
(74) *Attorney, Agent, or Firm* — McGuireWoods LLP

(57) ABSTRACT

A system, method, and computer-readable medium for performing an auto-query construction operation for use with a distributed analytics operation. More specifically, in certain embodiments, the auto-query construction operation provides automatically generates SQL code instructions via an auto-query construction user interface (UI) settings in a computational system, such as the Dell Statistica computational system. The auto-query construction operation allows a user to interact with a common interface to provide query information including decision variables, parameters of an analysis and convergence criteria. The query information provided via the UI is automatically transformed to database queries and subsequent computation system operations. Thus, the user experience remains intact whether the analytics is performed in database or within the computation system.

15 Claims, 14 Drawing Sheets

(51) Int. Cl.
   *G06F 17/28*   (2006.01)
   *G06F 16/248*  (2019.01)
   *G06F 16/245*  (2019.01)

(56) References Cited

U.S. PATENT DOCUMENTS

| | | | | |
|---|---|---|---|---|
| 2007/0198328 | A1* | 8/2007 | Fuller | G06Q 10/00 |
| | | | | 711/170 |
| 2008/0313161 | A1* | 12/2008 | Ramsey | G06F 8/41 |
| 2010/0082517 | A1* | 4/2010 | Schapker, II | G06F 16/217 |
| | | | | 706/47 |
| 2012/0005190 | A1* | 1/2012 | Faerber | G06F 16/2433 |
| | | | | 707/718 |
| 2014/0278754 | A1* | 9/2014 | Cronin | G06Q 30/0201 |
| | | | | 705/7.29 |
| 2017/0046344 | A1* | 2/2017 | Butler | G06F 16/24522 |

OTHER PUBLICATIONS

George R. Butler et al., U.S. Appl. No. 14/826,770, filed Aug. 14, 2015, entitled Method for Performing In-Database Distributed Advanced Predictive Analytics Modeling via Common Queries.

* cited by examiner

| No | Statistic | Pattern |
|---|---|---|
| 1 | N of Cases | HiveQL: count(column1) as column1_count<br>SQL Server: count(column1) as column1_count<br>Oracle: count("column1") as column1_count |
| 2 | Mean | HiveQL: avg(column1) as column1_avg<br>SQL Server: avg(column1) as column1_avg<br>Oracle: avg("column1") as column1_avg |
| 3 | Sum | HiveQL: sum(column1) as column1_sum<br>SQL Server: sum(column1) as column1_sum<br>Oracle: sum("column1") as column1_sum |
| 4 | Std.Dev. | HiveQL: stddev(column1) as column1_stddev<br>SQL Server: stdev(column1) as column1_stddev<br>Oracle: stddev("column1") as column1_stddev |
| 5 | Variance | HiveQL: variance(column1) as column1_variance<br>SQL Server: var(column1) as column1_variance<br>Oracle: variance("column1") as column1_variance |
| 6 | Median | HiveQL: percentile_approx(column1,0.5) as column1_median<br><br>SQL Server<br>IF OBJECT_ID('tempdb.dbo.#tableofmins', 'U') IS NOT NULL DROP TABLE #tableofmins<br>Select COUNT(*) as rownum, MIN(column1) as column1 into #tableofmins from datatable<br>select MAX(CASE WHEN sub1.rownum <= tableofmins.rownum * 0.5 THEN sub1.(column1)<br>ELSE tableofmins.column1 END)<br>    as column1_median<br>    from (<br>    SELECT ROW_NUMBER() OVER (ORDER BY column1) as rownum,<br>    column1<br>    FROM datatable<br>    ) sub1, #tableofmins tableofmins<br>drop table #tableofmins<br><br>Oracle:<br>SELECT<br>MAX(CASE WHEN sub1."rownum" <=<br>0.5*(Round(sub1."grandrownum"*0.5,0)+1+ABS(Round(sub1."grandrownum"*0.5,0)-1))<br>THEN sub1."column1" ELSE NULL END) as "_median",<br>'column1' as "VarName" from<br>(SELECT ROW_NUMBER() OVER (ORDER BY "column1") as "rownum",(SELECT COUNT(*)<br>FROM "database"."datatable" WHERE "column1" is not null) as<br>"grandrownum",cast("column1" as float) as "column1" FROM "database"."datatable"<br>WHERE "column1" is not null) sub1 |
| 7 | Min - Max | HiveQL: min(column1) as column1_min,max(column1) as column1_max<br>SQL Server: min(column1) as column1_min, max(column1) as column1_max<br>Oracle: min("column1") as column1_min , max("column1") as column1_max |

*Figure 6A*

| No | Statistic | Pattern |
|---|---|---|
| 8 | Percentiles | HiveQL: percentile_approx(column1, array(0.1,0.2,0.3,0.4,0.5,0.6,0.7,0.8,0.9)) as column1_percentiles<br><br>SQL Server<br>IF OBJECT_ID('tempdb.dbo.#tableofmins', 'U') IS NOT NULL DROP TABLE #tableofmins<br>Select COUNT(*) as rownum, MIN(column1) as column1 into #tableofmins from datatable<br>select cast(MAX(CASE WHEN sub1.rownum <= tableofmins.rownum * 0.1 THEN<br>sub1.[column1] ELSE tableofmins.column1 END) as nvarchar) +<br>    ',' + cast(MAX(CASE WHEN sub1.rownum <= tableofmins.rownum * 0.2 THEN<br>sub1.[column1] ELSE tableofmins.column1 END) as nvarchar) +<br>    ',' + cast(MAX(CASE WHEN sub1.rownum <= tableofmins.rownum * 0.3 THEN<br>sub1.[column1] ELSE tableofmins.column1 END) as nvarchar) +<br>    ',' + cast(MAX(CASE WHEN sub1.rownum <= tableofmins.rownum * 0.4 THEN<br>sub1.[column1] ELSE tableofmins.column1 END) as nvarchar) +<br>    ',' + cast(MAX(CASE WHEN sub1.rownum <= tableofmins.rownum * 0.5 THEN<br>sub1.[column1] ELSE tableofmins.column1 END) as nvarchar) +<br>    ',' + cast(MAX(CASE WHEN sub1.rownum <= tableofmins.rownum * 0.6 THEN<br>sub1.[column1] ELSE tableofmins.column1 END) as nvarchar) +<br>    ',' + cast(MAX(CASE WHEN sub1.rownum <= tableofmins.rownum * 0.7 THEN<br>sub1.[column1] ELSE tableofmins.column1 END) as nvarchar) +<br>    ',' + cast(MAX(CASE WHEN sub1.rownum <= tableofmins.rownum * 0.8 THEN<br>sub1.[column1] ELSE tableofmins.column1 END) as nvarchar) +<br>    ',' + cast(MAX(CASE WHEN sub1.rownum <= tableofmins.rownum * 0.9 THEN<br>sub1.[column1] ELSE tableofmins.column1 END) as nvarchar)<br>as column1_percentiles<br>from (<br>    SELECT ROW_NUMBER() OVER (ORDER BY column1) as rownum,<br>    column1<br>    FROM datatable<br>) sub1, #tableofmins tableofmins<br>drop table #tableofmins<br><br>Oracle:<br>select cast(MAX(CASE WHEN sub1."rownum" <=<br>0.5*(Round(sub1."grandrownum"*0.1,0)+1+ABS(Round(sub1."grandrownum"*0.1,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.2,0)+1+ABS(Round(sub1."grandrownum"*0.2,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.3,0)+1+ABS(Round(sub1."grandrownum"*0.3,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.4,0)+1+ABS(Round(sub1."grandrownum"*0.4,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.5,0)+1+ABS(Round(sub1."grandrownum"*0.5,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.6,0)+1+ABS(Round(sub1."grandrownum"*0.6,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.7,0)+1+ABS(Round(sub1."grandrownum"*0.7,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.8,0)+1+ABS(Round(sub1."grandrownum"*0.8,0)-1))<br>THEN sub1."column1" ELSE NULL END) as nvarchar2(30)) \|\| ','<br>\|\| cast(MAX(CASE WHEN sub1."rownum" <=<br>0.5*(Round(sub1."grandrownum"*0.9,0)+1+ABS(Round(sub1."grandrownum"*0.9,0)-1))<br>THEN sub1."column1" ELSE NULL END) as nvarchar2(30)) as "_percentiles",<br>'column1' as "VarName" from<br>(SELECT ROW_NUMBER() OVER (ORDER BY "column1") as "rownum",(SELECT COUNT(*)<br>FROM "database"."datatable" WHERE "column1" is not null) as<br>"grandrownum",cast("column1" as float) as "column1" FROM "database"."datatable"<br>WHERE "column1" is not null) sub1 |

*Figure 6B*

| No | Statistic | Pattern |
|---|---|---|
| 9 | Skewness | SQL Server<br>select (1.0\*sum_n/((sum_n-1.0)\*(sum_n-2.0)))\*(sum_x3-(3.0/sum_n)\*sum_x\*sum_x2+(2.0/(sum_n\*sum_n))\*sum_x\*sum_x\*sum_x)\*power(sum_n-1.0,1.5)/(power((sum_x2-(1.0/sum_n)\*sum_x\*sum_x),1.5)) as skewness<br>from (<br>SELECT<br>cast(sum(1.0) as float) as sum_n,<br>cast(sum([column1]) as float) as sum_x,<br>cast(sum([column1]\*[column1]) as float) as sum_x2,<br>cast(sum([column1]\*[column1]\*[column1]) as float) as sum_x3,<br>cast(sum([column1]\*[column1]\*[column1]\*[column1]) as float) as sum_x4<br>FROM [database].[dbo].[datatable]) sub1<br><br>Oracle<br>select (1.0\*sum_n/((sum_n-1.0)\*(sum_n-2.0)))\*(sum_x3-(3.0/sum_n)\*sum_x\*sum_x2+(2.0/(sum_n\*sum_n))\*sum_x\*sum_x\*sum_x)\*power(sum_n-1.0,1.5)/(power((sum_x2-(1.0/sum_n)\*sum_x\*sum_x),1.5)) as skewness<br>from (<br>SELECT<br>cast(sum(1.0) as float) as sum_n,<br>cast(sum("column1") as float) as sum_x,<br>cast(sum("column1"\*"column1") as float) as sum_x2,<br>cast(sum("column1"\*"column1"\*"column1") as float) as sum_x3,<br>cast(sum("column1"\*"column1"\*"column1"\*"column1") as float) as sum_x4<br>FROM "datatable" ) sub1 |
| 10 | Kurtosis | SQL Server<br>select (1.0\*sum_n\*(sum_n+1)/((sum_n-1.0)\*(sum_n-2.0)\*(sum_n-3.0)))\*(sum_x4-(4.0/sum_n)\*sum_x\*sum_x3+(6.0/(sum_n\*sum_n))\*sum_x\*sum_x\*sum_x2-(3.0/(sum_n\*sum_n\*sum_n))\*sum_x\*sum_x\*sum_x\*sum_x)<br>\*power(sum_n-1.0,2)/(power((sum_x2-(1.0/sum_n)\*sum_x\*sum_x),2)) - 3\*((sum_n-1.0)\*(sum_n-1.0)/((sum_n-2.0)\*(sum_n-3.0))) as kurtosis<br>from (<br>SELECT<br>cast(sum(1.0) as float) as sum_n,<br>cast(sum([column1]) as float) as sum_x,<br>cast(sum([column1]\*[column1]) as float) as sum_x2,<br>cast(sum([column1]\*[column1]\*[column1]) as float) as sum_x3,<br>cast(sum([column1]\*[column1]\*[column1]\*[column1]) as float) as sum_x4<br>FROM [database].[dbo].[datatable]<br>) sub1<br><br>Oracle<br>select (1.0\*sum_n\*(sum_n+1)/((sum_n-1.0)\*(sum_n-2.0)\*(sum_n-3.0)))\*(sum_x4-(4.0/sum_n)\*sum_x\*sum_x3+(6.0/(sum_n\*sum_n))\*sum_x\*sum_x\*sum_x2-(3.0/(sum_n\*sum_n\*sum_n))\*sum_x\*sum_x\*sum_x\*sum_x)<br>\*power(sum_n-1.0,2)/(power((sum_x2-(1.0/sum_n)\*sum_x\*sum_x),2)) - 3\*((sum_n-1.0)\*(sum_n-1.0)/((sum_n-2.0)\*(sum_n-3.0))) as kurtosis<br>from (<br>SELECT<br>cast(sum(1.0) as float) as sum_n,<br>cast(sum("column1") as float) as sum_x,<br>cast(sum("column1"\*"column1") as float) as sum_x2,<br>cast(sum("column1"\*"column1"\*"column1") as float) as sum_x3,<br>cast(sum("column1"\*"column1"\*"column1"\*"column1") as float) as sum_x4<br>FROM "datatable"<br>) sub1 |

```sql
SELECT [Age]
      ,[Party]
      ,[Gender]
      ,[Vote]
  FROM [ST_DATA].[dbo].[ElectionsLogisticRegrExample]
```

| | Age | Party | Gender | Vote |
|---|---|---|---|---|
| 1 | 20 | Rep | Male | Yes |
| 2 | 25 | Dem | Male | Yes |
| 3 | 45 | Ind | Male | No |
| 4 | 35 | Rep | Female | Yes |
| 5 | 50 | Dem | Female | Yes |
| 6 | 55 | Ind | Female | Yes |
| 7 | 39 | Rep | Male | No |
| 8 | 48 | Dem | Male | No |
| 9 | 30 | Ind | Male | Yes |
| 10 | 27 | Rep | Female | Yes |
| 11 | 47 | Dem | Female | No |
| 12 | 21 | Ind | Female | No |
| 13 | 48 | Rep | Male | Yes |
| 14 | 24 | Ind | Male | No |
| 15 | 28 | Ind | Female | No |
| 16 | 40 | Dem | Female | Yes |

*Figure 10*

AUTO QUERY CONSTRUCTION FOR IN-DATABASE PREDICTIVE ANALYTICS

BACKGROUND OF THE INVENTION

Field of the Invention

The present invention relates to information handling systems. More specifically, embodiments of the invention relate to a system, method, and computer-readable medium for performing an auto-query construction operation for use with a distributed analytics operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, automated manufacturing, or global communications. In addition, information handling systems may include a variety of hardware and software components that may be configured to process, store, and communicate information and may include one or more computer systems, data storage systems, and networking systems.

It is known to use information handling systems to collect and store large amounts of data. Many technologies are being developed to process large data sets (often referred to as "big data," and defined as an amount of data that is larger than what can be copied in its entirety from the storage location to another computing device for processing within time limits acceptable for timely operation of an application using the data).

In-database predictive analytics have become increasingly relevant and important to address big-data analytic problems. When the amount of data that need be processed to perform the computations required to fit a predictive model become so large that it is too time-consuming to move the data to the analytic processor or server, then the computations must be moved to the data, i.e., to the data storage server and database. Because modern big-data storage platforms typically store data across distributed nodes, the computations often must be distributed also. I.e., the computations often need be implemented in a manner that data-processing intensive computations are performed on the data at each node, so that data need not be moved to a separate computational engine or node. For example the Hadoop distributed storage framework includes well-known map-reduce implementations of many simple computational algorithms (e.g., for computing sums or other aggregate statistics).

However, to perform more complex computations in this manner (for example via map-reduce computations, or via stored in-database procedures), as are often necessary in the context of predictive analytics, it is usually necessary to develop specific software that is deployed to a respective data storage platform (e.g., database) where the data are stored and the computations are to be performed. For example, to perform distributed in-database computations in a Hadoop distributed storage framework, specific code needs to be developed (e.g., in a Java programming language) to implement the specific algorithms. This code is specific to in-database computations in a Hadoop distributed storage framework and cannot be easily applied to other popular database platforms, such as Teradata, SQL Server, Oracle and others. Likewise, in-database stored procedures specifically targeting for example a SQL Server type database will not be compatible with other database platforms such as a Teradata type database or a Hadoop type database. Additionally, when performing complex computations in this manner it is often difficult to construct the query for performing in-database predictive analytics.

SUMMARY OF THE INVENTION

A system, method, and computer-readable medium are disclosed for performing an auto-query construction operation for use with a distributed analytics operation. More specifically, in certain embodiments, the auto-query construction operation provides automatically generates SQL code instructions via an auto-query construction user interface (UI) settings in a computational system, such as Dell Statistica. The auto-query construction operation allows a user to interact with a common interface to provide query information including decision variables, parameters of an analysis and convergence criteria. The query information provided via the UI is automatically transformed to database statements such as SQL queries and subsequent computation system operations. Thus, the user experience remains intact whether the analytics is performed in database or within the computation system.

In certain embodiments, the auto-query construction operation is performed via an auto-query construction system. In certain embodiments, the auto-query construction system includes a plurality of query modules. In certain embodiments the plurality of query modules generate dynamic SQL instructions based on user selections as a part of in-database predictive modeling algorithms that offload large volume computations to the database engine. In certain embodiments, the query modules include a descriptive statistics module, a multiple regression module, a logistic regression module, a CHi-squared Automatic Interaction Detection (CHAID) trees module, a k-means clustering module, a market basket association rules extraction module, a feature selection module and a random sampling module. In certain embodiments, the auto-query system provides a template for unit computation for a respective database target, which is then used to generate a full SQL query based on the query information. For example, in certain embodiments the query information is based on user selection of decision variables. In certain embodiments, unit SQL templates include one or more characteristics including: the unit query templates are parameterized based on user selected decision variables, target database and table; the unit SQL templates support different forms of SQL unit templates for various target databases; the appropriate template is used based on the user selection of the target database; the final result of the query execution includes all of the information needed for a predictive model (including correlations, counts, sums of squares, means, standard deviations, or other summary statistics required to complete the respective statistical results) and is presented in a way that can be consumed by the computational software; and, numerical precision of the result of the query execution matches the same result computed on computational system (i.e., the unit SQL template contains appropriate conversions of field types).

The auto-query construction system provides graphical user interface settings to design queries that allow statistical computations as a part of in-database predictive analytics. No database knowledge is required from the user to perform such operations. The computation engine leverages all capabilities of the storage system for distributed processing to perform large data volume operations of computing aggregates or samples.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6A, 6B, and 6C, generally referred to as FIG. 6, show a table of relationships between generic queries as input via a user interface to specific in-database queries generated by an auto-query construction system.

FIG. 8 shows an example correlation matrix as generated by an analytics system.

FIG. 10 shows an example design matrix preparation.

DETAILED DESCRIPTION

Certain aspects of the present disclosure recognize that because users with different backgrounds and in different roles within organizations often need access to in-database predictive analytics, it is becoming increasingly important to provide simple to use, efficient and well thought-through user interface components that can perform predictive modeling operations. Attempts to manually define in-database analytics computations can lead to a plurality of challenges. For example, manual implementation of SQL-based in-database computations and data-processing intensive computations outside of it requires advanced skills from a plurality of different domains including databases, predictive analytics and software development.

Additionally, certain aspects of the present disclosure appreciate that often a business user needs a way to parameterize the model as well as select decision variables in real time, which means that the SQL code instructions for in-database computations is required to be dynamically generated based on the users elections. Accordingly, it would be desirable to provide a system which can verify user-input with respect to target database constraints. Additionally, certain aspects of the present disclosure appreciate that in some use cases predictive model learning process can be iterative in nature, e.g. that for logistic regression or Chi-squared Automatic Interaction Detection (CHAID) trees, which can make it tedious to manually create SQL code instructions for database side computations for each step of iterations process.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
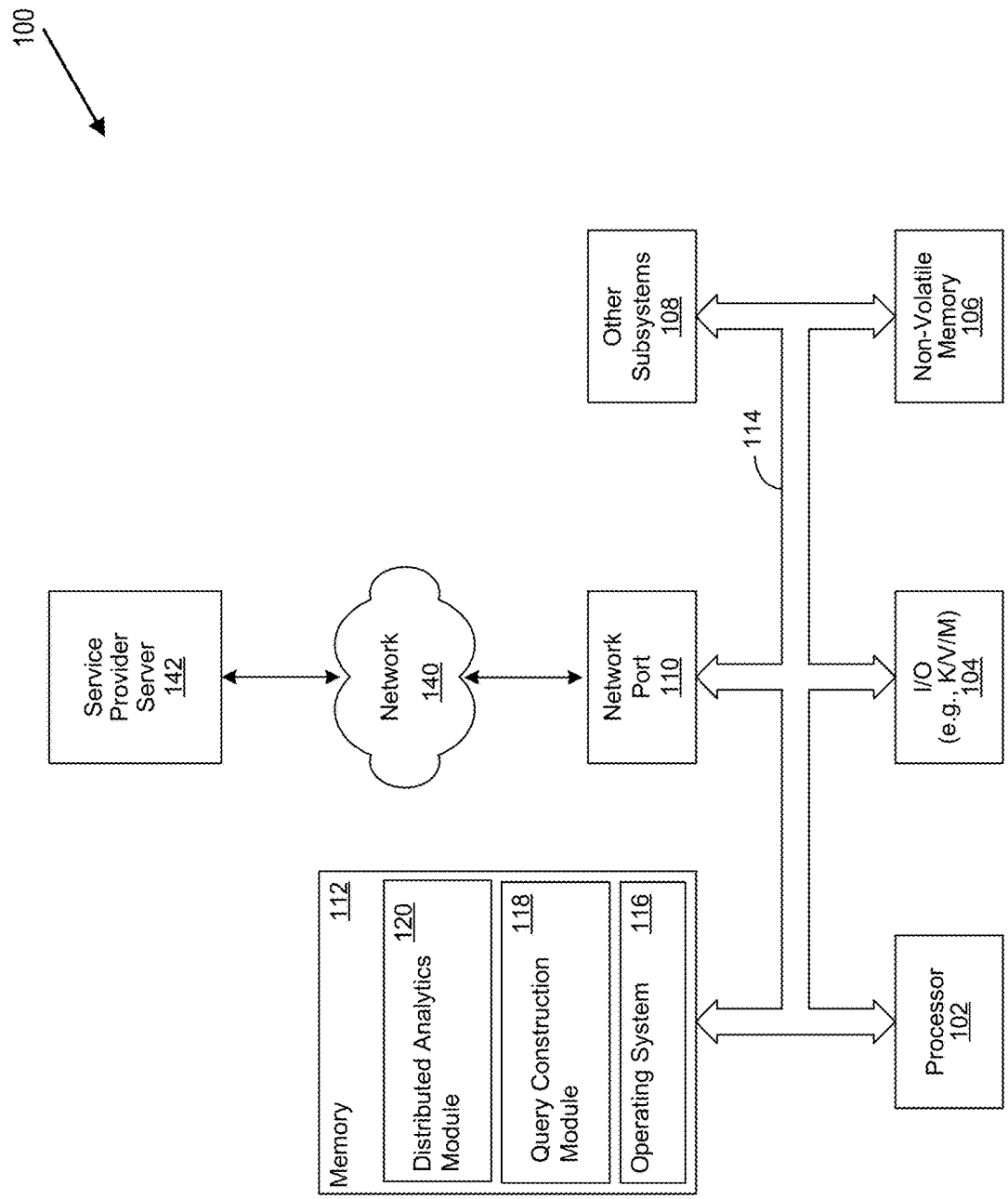
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a query construction module 118 as well as a distributed analytics module 120. In certain embodiments, the information handling system 100 may be coupled to a database (not shown in FIG. 1) via the network 140.

The query construction module 118 performs a query construction operation. In certain embodiments the auto-query construction operation is for use with a distributed analytics operation. More specifically, in certain embodiments, the auto-query construction operation provides automatically generates SQL code instructions via an auto-query construction user interface (UI) settings in a computational system (i.e., an analytics system), such as the Statistica computational system available from Dell Inc. The auto-query construction operation allows a user to interact with a common interface to provide query information including decision variables, parameters of an analysis and convergence criteria. The query information provided via the UI is automatically transformed to database side SQL queries and subsequent computation system operations. Thus, the user experience remains intact whether the analytics is performed in database or within the computation system.

In certain embodiments, the auto-query construction operation is performed via an auto-query construction system. In certain embodiments, the auto-query construction system includes a plurality of query modules. In certain embodiments the plurality of query modules generate dynamic SQL instructions based on user selections as a part of in-database predictive modeling algorithms that offload large volume computations to the database engine. In certain embodiments, the query modules include a descriptive statistics module, a multiple regression module, a logistic regression module, a CHAID trees module, a k-means clustering module, a market basket association analysis module, a feature selection module and a random sampling module. In certain embodiments, the auto-query system provides a template for unit computation for a respective database target, which is then used to generate a full SQL query based on the query information. For example, in certain embodiments the query information is based on user selection of decision variables. In certain embodiments, unit SQL templates satisfy one or more criteria including: the unit query templates are parameterized based on user selected decision variables, target database and table; the unit SQL templates support different forms of SQL unit templates for various target databases; the appropriate template is used based on the user selection of the target database; the final result of the query execution includes all of the information needed for a predictive model (including correlations, counts, sums of squares, means, standard deviations) and is presented in a way that can be consumed by the computational software; and, numerical precision of the result of the query execution matches the same result computed on computational system (i.e., the unit SQL template contain appropriate conversions of field types).

The auto-query construction system provides graphical user interface settings to design queries that allow statistical computations as a part of in-database predictive analytics. No database knowledge is required from the user to perform such operations. The computation engine leverages all capabilities of the storage system for distributed processing to perform large data volume operations of computing aggregates or samples.

This method is implemented without requiring the deployment of storage system specific agents or computer code and thus can function with practically all data storage systems, including all standard databases, Hadoop type databases and/or Spark via Hive (and HiveQL) type databases, as well as with emerging appliances such as Microsoft Analytics Platform System (APS). Thus, the computation system and computation engine are agnostic with respect to the actual storage systems in use, and hence capable of supporting hybrid environments. Such a system is much easier to deploy, maintain, and scale as well.

Figure 2:
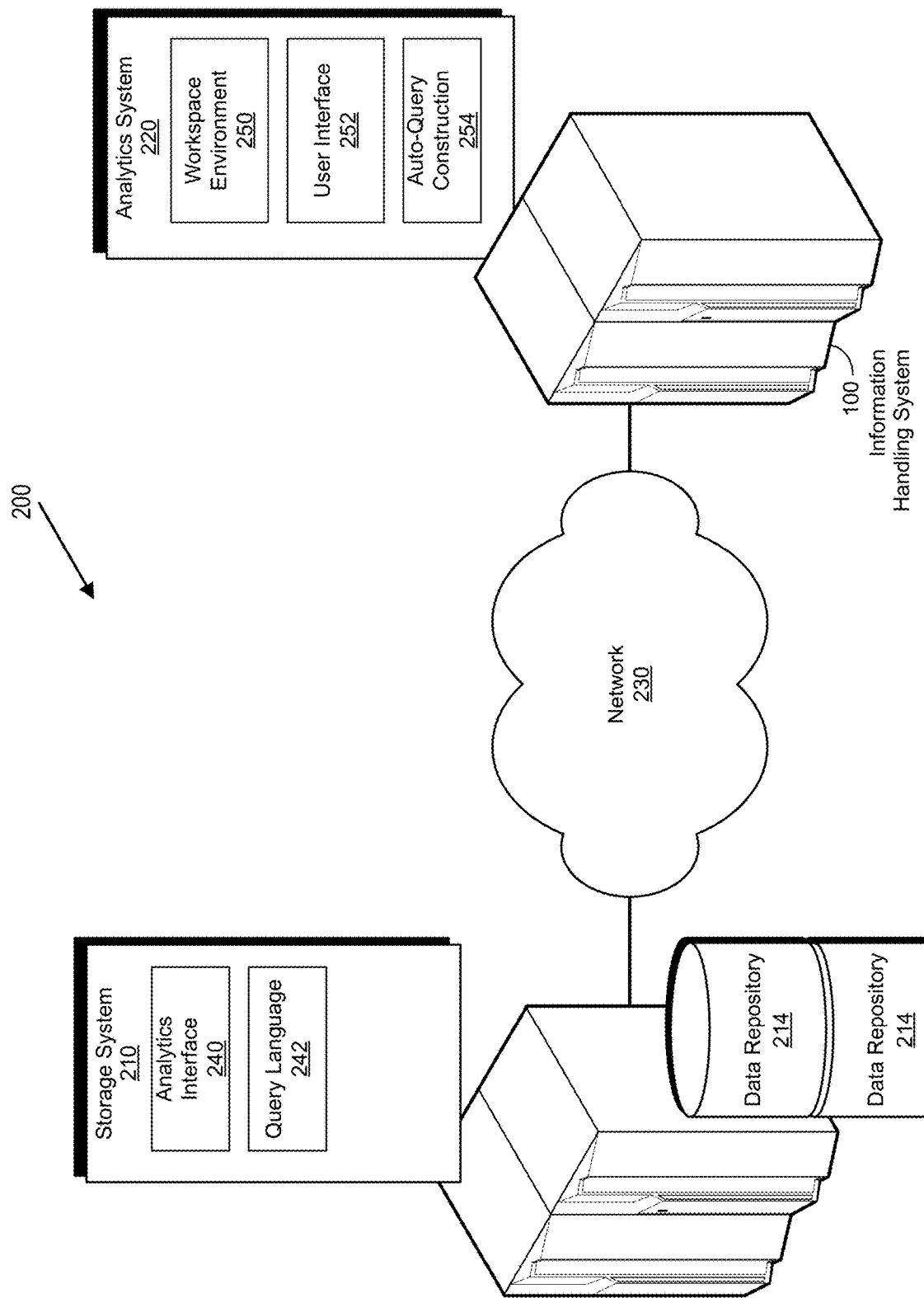
FIG. 2 shows a block diagram of an environment for virtualizing data processing for analytics and scoring.

FIG. 2 shows a simplified block diagram of a distributed analytics environment 200 in accordance with an embodiment of the invention. More specifically, the distributed analytics environment 200 includes a storage system 210 which includes one or more data repositories 214. The distributed analytics environment 200 further includes an analytics system 220 which is coupled with the storage system 210 via a network 230, which may be a private network, a public network, a local or wide area network, the Internet, combinations of the same, or the like. In various embodiments, the network 140 is included within the network 208. Either or both the storage system 210 and the analytics system 220 may reside within and execute on an information handling system 100. Portions of the storage system 210 as well as the analytics system 220 provide a query construction system and/or a distributed analytics system. Some or all of the functions of the query construction system and/or the distributed analytics system may be performed via the query construction module 118 and the distributed analytics module 120, respectively.

The storage system 210 is configured to perform distributed computations to derive suitable aggregate summary statistics, such as summations, multiplications, and derivation of new variables via formulae. In various embodiments, the storage system 210 comprises a SQL Server, an Oracle type storage system, a Hive type storage system and/or a Teradata Server. It will be appreciated that other database platforms and systems are within the scope of the invention. It will also be appreciated that the storage system can comprise a plurality of databases which may or may not be the same type of database.

The storage system 210 includes an analytics interface 240. The storage system 210 further includes an auto-query construction system 244. The storage system 210 executes a query language 242. The query language 242 enables the storage system 210 to initiate and control the execution of the distributed summary computations and aggregations in-database. In certain embodiments, the query language 242 is included within the analytics interface 240. In various embodiments, the query language 242 is defined by the type of storage system used and typically corresponds to one of the dialects of the SQL.

The analytics system 220 performs statistical and mathematical computations. In certain embodiments, the analytics system 220 comprises a Statistica Analytics System available from Dell, Inc. The analytics system 220 comprises a workspace environment 250, user interfaces 252 for combining aggregate statistics and numerical summaries computed by the Storage System 210 and an auto-query construction system 254. The auto-query construction system 254 constructs queries for execution by the query language 242. The analytics system 220 further performs mathematical and statistical computations to derive final predictive models. In certain embodiments, Statistica Data Miner Workspace environment available from Dell, Inc. and the Graphical User Interface of the Statistica Data Miner Workspace are examples of the workspace environment 250 and user interfaces 252, respectively.

The workspace environment 250 provides summaries and aggregates which are computed via common queries, executed through the storage system 210, and executed via distributed query execution enabled through the capabilities of the storage system 210. For some algorithms, the execution performed on the Storage System 210 is initiated via derived variables defined through queries (e.g., coded design matrices), sums, sums of squared values, sums of squared cross-products of values, weights, numbers of observations, and other aggregate values. Additionally, in certain embodiments, the results of the execution performed on the storage system 210 are then further processed by the workspace environment 250 on the analytics system 220 to compute predictive models via multiple linear regression, general linear models, general logistic regression models, principal components analysis, cluster analyses, recursive partitioning (tree) models, and others.

Additionally, in certain embodiments, the execution performed on the storage system 210 includes performing certain computations and then creating subsamples of the results of the execution on the storage system 210. These subsamples are accessed by the workspace environment via queries subsamples of all data. The analytics system 220 can then operate on subsamples to compute (iteratively, e.g., over consecutive samples) final predictive models. Additionally, in certain embodiments, the subsamples are further processed by the workspace environment 250 on the analytics system 220 to compute predictive models including recursive partitioning models (trees, boosted trees, random forests), support vector machines, neural networks, and others.

In this process, consecutive samples may be random samples extracted at the storage system 210, or samples of consecutive observations returned by queries executing in the storage system 210. The analytics system 220 computes and refines desired coefficients for predictive models from consecutively returned samples, until the computations of consecutive samples no longer lead to modifications of those coefficients. In this manner, not all data in the storage system 210 ever needs to be processed.

The user interface 252 of the analytics system 220 provides user interface options to parameterize and optimize the computations. For example, in certain embodiments options are provided to enable simple computations on small samples extracted from the storage system 210, to derive best initial parameter estimates for any of the prediction models. The SQL query-based operation is then used to refine and finalize the model parameters. The user interface 252 also interacts with the auto-query construction system 254 to provide query construction user interfaces. The query construction user interfaces facilitate automatic construction of queries for in database predictive analytics.

Accordingly, the distributed analytics environment 200 enables in-database distributed analytics to be performed in a platform-agnostic fashion. Regardless of the actual data storage system, the analytics system 220 is able to leverage all capabilities of the Storage System for distributed processing, to perform the data-processing-intensive operations of computing aggregates or samples.

The distributed analytics environment 200 is implemented, without requiring deployment of storage system specific agents or computer code, against many different data storage systems, including all standard databases, Hadoop type storage systems or Spark via Hive (and HiveQL), or to emerging appliances such as Microsoft APS. The analytics system 220 and workspace environment 250 are agnostic with respect to the actual storage systems in use, and hence capable of supporting hybrid environments. Such a distributed analytics system would be much easier to deploy, maintain, and scale.

In various embodiments, the network 230 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Figure 3:
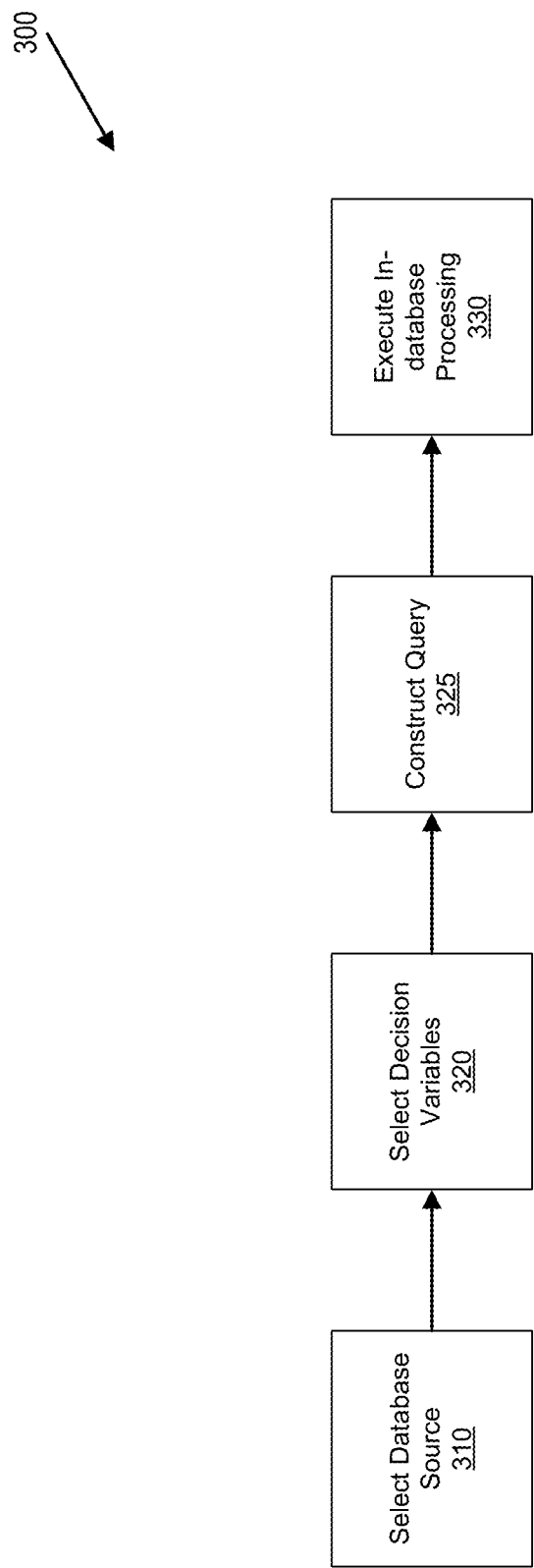
FIG. 3 shows a flow diagram of an in-database processing operation.

FIG. 3 shows a flow diagram of an end-user perspective of in-database processing operation. More specifically, when performing an in-database processing operation 300, the user selects a database source at step 310. The database source can be any compliant database. For the purposes of the present disclosure, a compliant database comprises a database which has corresponds to the open database connectivity (ODBC) or open link and embedding database (OLE DB) database standards with SQL dialect or a database which supports a functionally comparative formal query language allowing the database to perform distributed computations. Examples of compliant databases include the Microsoft SQL Server database, Microsoft SQL Server Parallel Distributed Warehouse (PDW) database, Oracle database, Teradata database, Apache Hive database, MySQL database, and IBM Netezza database.

Next, the user selects decision variables via a query user interface at step 320. When selecting the decision variables, a database table description is acquired, e.g., via the workspace environment 252 of the analytics system 220. Next, the auto-query construction system automatically constructs the query based upon the selected decision variables. Next, at step 330, the in-database processing is executed by the storage system 210. When executing the in-database processing, only the final results of the execution are extracted by the analytics system 220.

The in-database processing operation empowers analysis with an in-database processing capabilities while only needing three steps to configure the processing. Additionally, by providing an in-database analysis user interface within the analytics system 220, the in-database processing capabilities can be configured with no knowledge or SQL programming or database configuration in general. Additionally, all of the performance intensive computations are executed on the database side of the environment, significantly reducing the amount of data that needs to be provided from the database to the analytics system 220.

The query construction system 254 appreciates that extracting data from database, typically requires at least two string parameters, a database connection string parameter and a SQL query parameter. The database connection string parameter stores database information such as information about the database provider, security and login info, initial catalog and data source network location. With many databases, the database connections are static and change rarely. The SQL query parameter is often dynamic. The SQL query parameter changes depending on the task at hand, e.g. specific selection of the decision variables. In certain embodiments performing in-database predictive analytics the SQL query parameter is divided into two query components: a static data configuration component and a dynamic user-interface driven SQL component. The static data configuration component describes substantially everything available in the database table or view in the form of simple 'Select' statement (e.g., SELECT column1, column2 FROM database.dbo.datatable.) As is often the case with database connections, the data configuration configuration described by the data configuration component are often generated by ID administrators who grant access permissions to the end-users rather than end-business-users. In certain embodiments, the query construction system 254 provides dynamic user-interface driven SQL query parameters which then generate data configuration and data transformations as subqueries. For example, if the end-user wishes to compute average of column1, the resultant query which is generated by the query construction system 254 might be set forth as:

```
SELECT AVG(column1) as mean_column1 FROM (SELECT
column1, column2 FROM database.dbo.datatable) subquery1.
```

The resultant subquery replicates a data configuration SQL query parameter which the initial query is flexible to support a number of different statistics as well as selection of different decision variables. For example, if a user chooses to compute averages and standard deviations for both columns the resultant query which is generated by the query construction system 254 might be set forth as:

```
SELECT AVG(column1) as mean_column1, STDEV(column1) as
stdev_column1, AVG(column2) as mean_column2, STDEV(column2)
as stdev_column2 FROM (SELECT column1, column2 FROM
database.dbo.datatable) subquery1.
```

As the number of selected decision variables and statistics grows it can become tedious to manually write and input such a query. The user interface of the query construction system 254 simplifies the task by providing separate tools for variable selection, which includes selection of the range of variables, and required statistics. In certain embodiments, the combinations of variables and statistics that go into the final query are generated automatically by concatenating respective templates into one large SQL string. In certain embodiments, the query construction system 254 takes into account that certain databases have limits on the number of columns per select statement. For example, SQL Server is limited by 4,096 columns per select statement (see e.g., Maximum Capacity Specifications for SQL Server, https://msdn.microsoft.com/en-us/library/ms143432.aspx, extracted Dec. 30, 2015). If the limitation is exceeded based on the user-interface settings, then the query construction system 254 automatically splits select statements into multiple queries. In certain embodiments, the query construction system 254 can execute such subqueries in sequential or parallel runs or combine those tasks in a single query using UNION ALL operation within a SQL system.

Figure 4A:
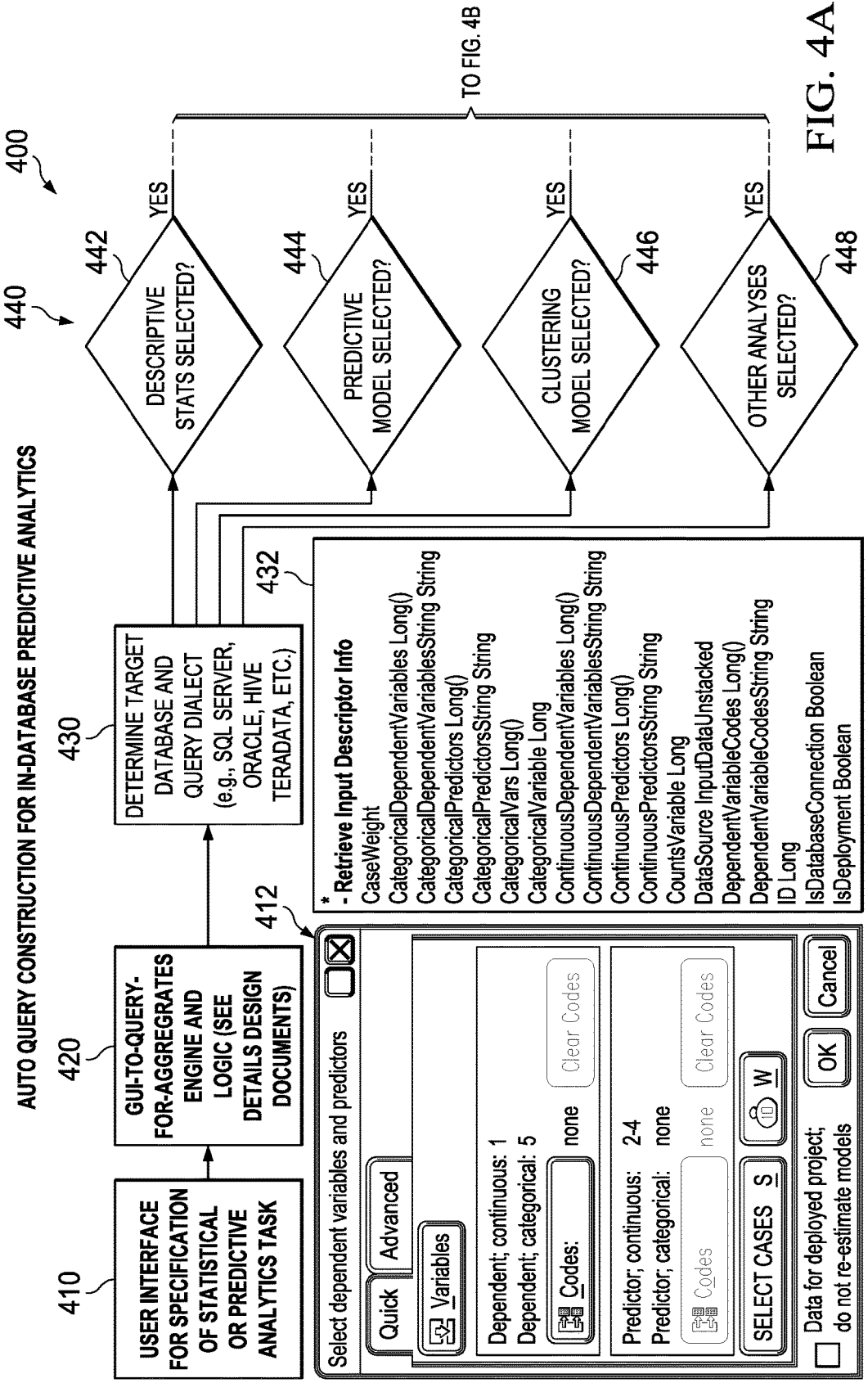
FIGS. 4A and 4B, generally referred to as FIG. 4, show a flow chart of an auto-query construction operation.
Figure 4B:
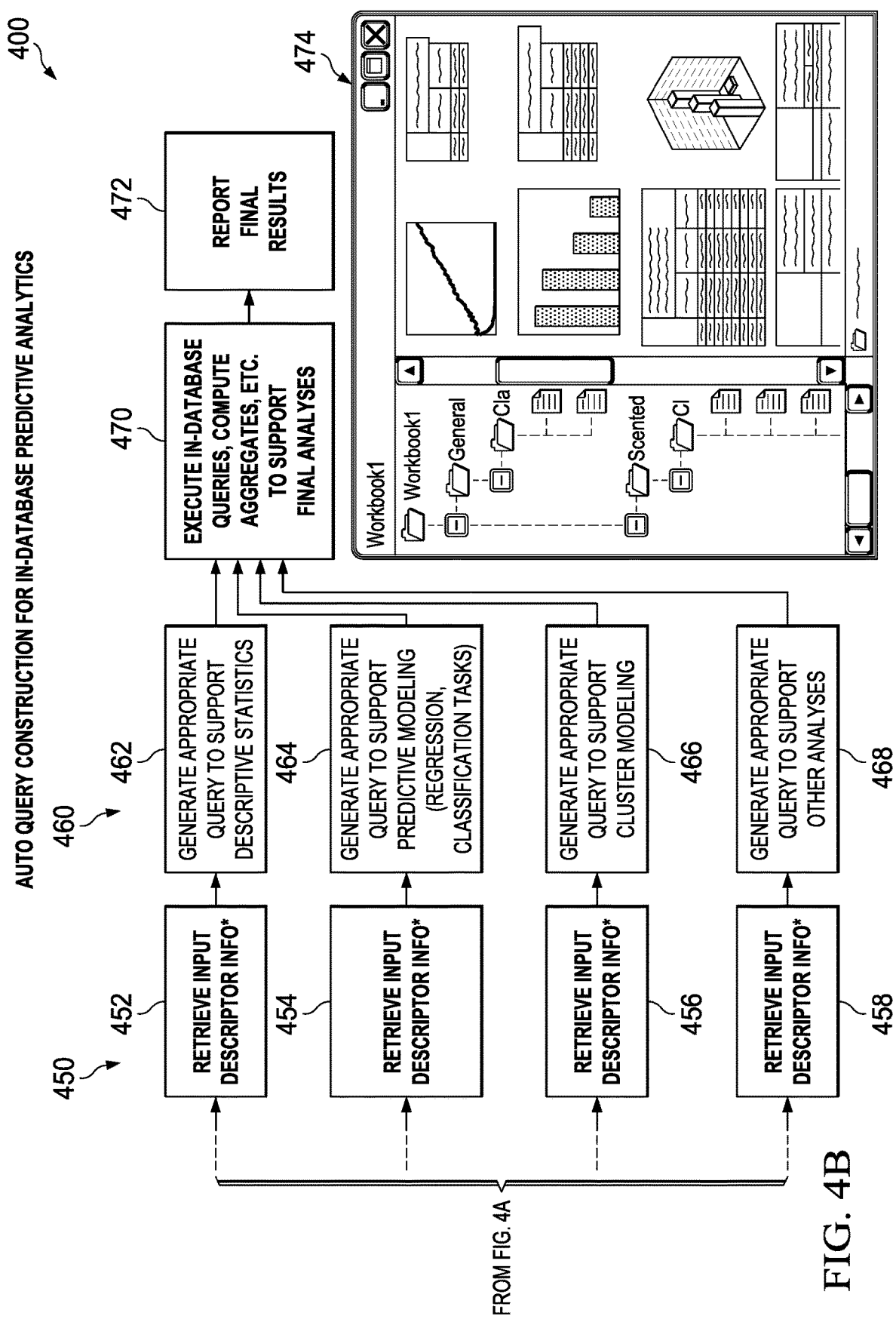

Referring to FIGS. 4A and 4B, a flow chart of an auto-query construction operation 400 is shown. More specifically, the operation begins at step 410 with the auto-query construction system presenting a user interface (e.g., user interface 412) for specification of a statistical or predictive analytics task. Next, at step 420, the auto-query construction system accesses a user interface to query for aggregators engine. Next at step 430, the auto-query construction system identifies a target database and a query dialect for the identified target database (see e.g., an object representation 432 of how the settings input via user interface 412 are presented to the computational system). Next at step 440, the auto-query construction system identifies a task selected by the user during via the user interface. More specifically, the auto-query construction system determines whether descriptive statistics have been selected at step 442, whether predictive model has been selected at step 444, whether a clustering model has been selected 446 and/or whether other analyses have been selected at step 448. Next the auto-query construction system performs a retrieval operation at step 450. More specifically, if the descriptive statistics have been selected, then the auto-query construction system retrieves input descriptor information (which represents the design of the analysis (e.g., a set of decision variables)) for performing the descriptive statistics operation at step 452. If the predictive model has been selected, then the auto-query construction system retrieves input descriptor information for performing the predictive model operation at step 454. If the clustering model has been selected, then the auto-query construction system retrieves input descriptor information for performing the clustering model operation at step 456. If other analyses have been selected, then the auto-query construction system retrieves input descriptor information for performing the other analyses operation at step 458.

Next at step 460, the auto-query construction system automatically generates an appropriate query (i.e., a database statement) based upon the information provided by the user via the user interface. More specifically, if the descriptive statistics have been selected, then the auto-query construction system uses input descriptor information to generate a query for performing the descriptive statistics operation at step 462. If the predictive model has been selected, then the auto-query construction system uses the input descriptor information to generate a query for performing the predictive model operation at step 464. If the clustering model has been selected, then the auto-query construction system uses the input descriptor information to generate a query for performing the clustering model operation at step 466. If other analyses have been selected, then the auto-query construction system uses the input descriptor information to generate a query for performing the other analyses operation at step 468. Next at step 470 the computational system executes the in-database queries, computes aggregates, etc. to support a final in database analysis and at step 472 reports the final results back to the user (e.g., via user interface 474).

Figure 5:
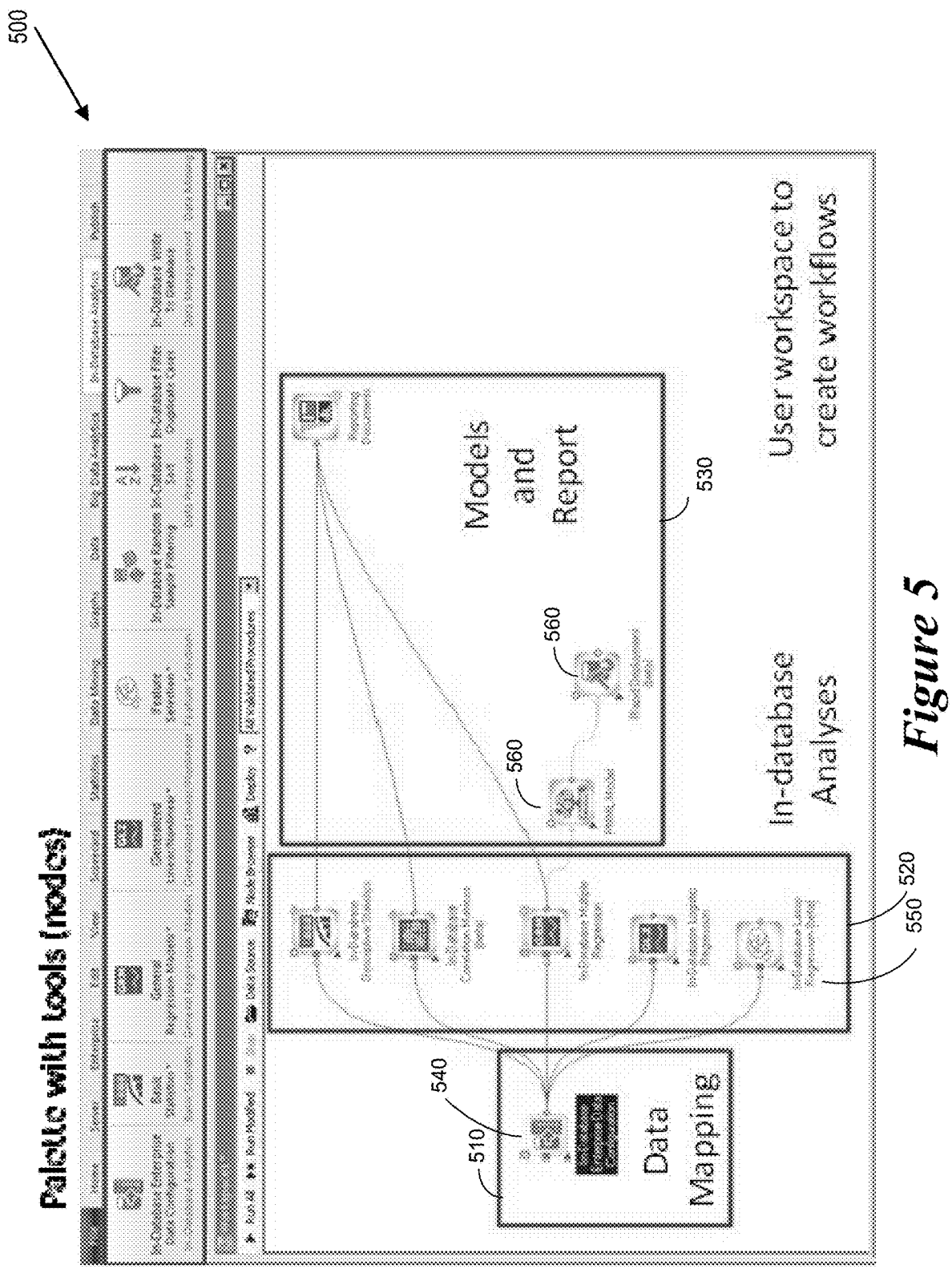
FIG. 5 shows a screen presentation of a user interface for creating workflows.

FIG. 5 shows a screen presentation 500 of a user interface for creating workflows. More specifically, the user interface for creating workflows includes a data mapping portion 510, an in-database analyses portion 520 and a models and report portion 530. The data mapping portion 520 presents one or more data mapping icons 540. A user may actuate a data mapping icon 540 to initiate a data mapping operation. The in-database analyses portion 520 presents one or more in-database analyses icons 550. A user may actuate an in database analyses icon 550 to initiate a data mapping operation. The models and report portion 530 presents one or more models and report icons 560. A user may actuate a models and report icon 560 to initiate a data mapping operation.

FIGS. 6A, 6B, and 6C, generally referred to as FIG. 6, show a table of relationships between generic database statements (e.g., database queries) as input via a user interface to specific in-database statements (e.g., in-database queries) generated by an auto-query construction system. In certain embodiments the generic queries comprise statistical analysis queries. In certain embodiments, the specific in-database statements correspond to at least one of a plurality of database types. In certain embodiments the plurality of database types comprise one or more of a HiveQL type database, a SQL Server type database and an Oracle type database.

The patterns are combined into a single or multiple queries given user's selection of statistics and variables. If percentiles are selected than one query per selected variable is executed since sorting of the full data table is needed for each variable to calculate percentiles (for SQL Server and Oracle).

Figure 7:
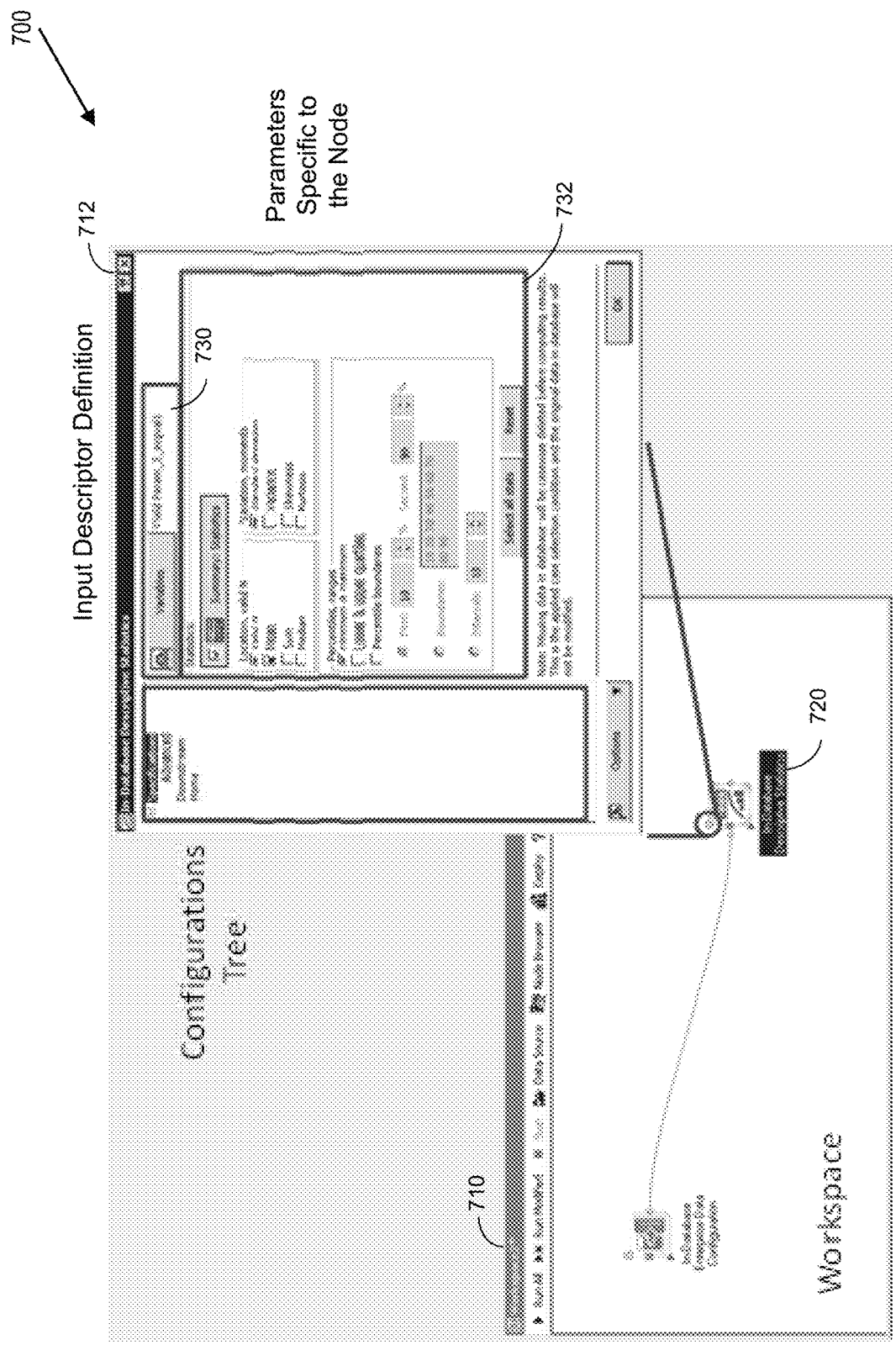
FIG. 7 shows a screen presentation of an example user interface for performing an auto-query construction operation.

FIG. 7 shows example screen presentations 700 of a user interface for performing an auto-query construction operation. More specifically, the screen presentations include a workspace user interface 710 and a configurations tree user interface 712. When a user actuates a configuration icon 720 within the workspace user interface 710, the auto-query system presents the configuration tree user interface 712. The configuration tree user interface 712 includes an input descriptor definition portion 730 via which a user can input variables. The configuration tree user interface 712 also includes a parameters portion 732 via which a user can configure parameters which are specific to a particular node of the configuration tree. While illustrating a generalized user interface, the example screen presentations 700 provide an example user interface for in-database descriptive statistics.

Figure 8:
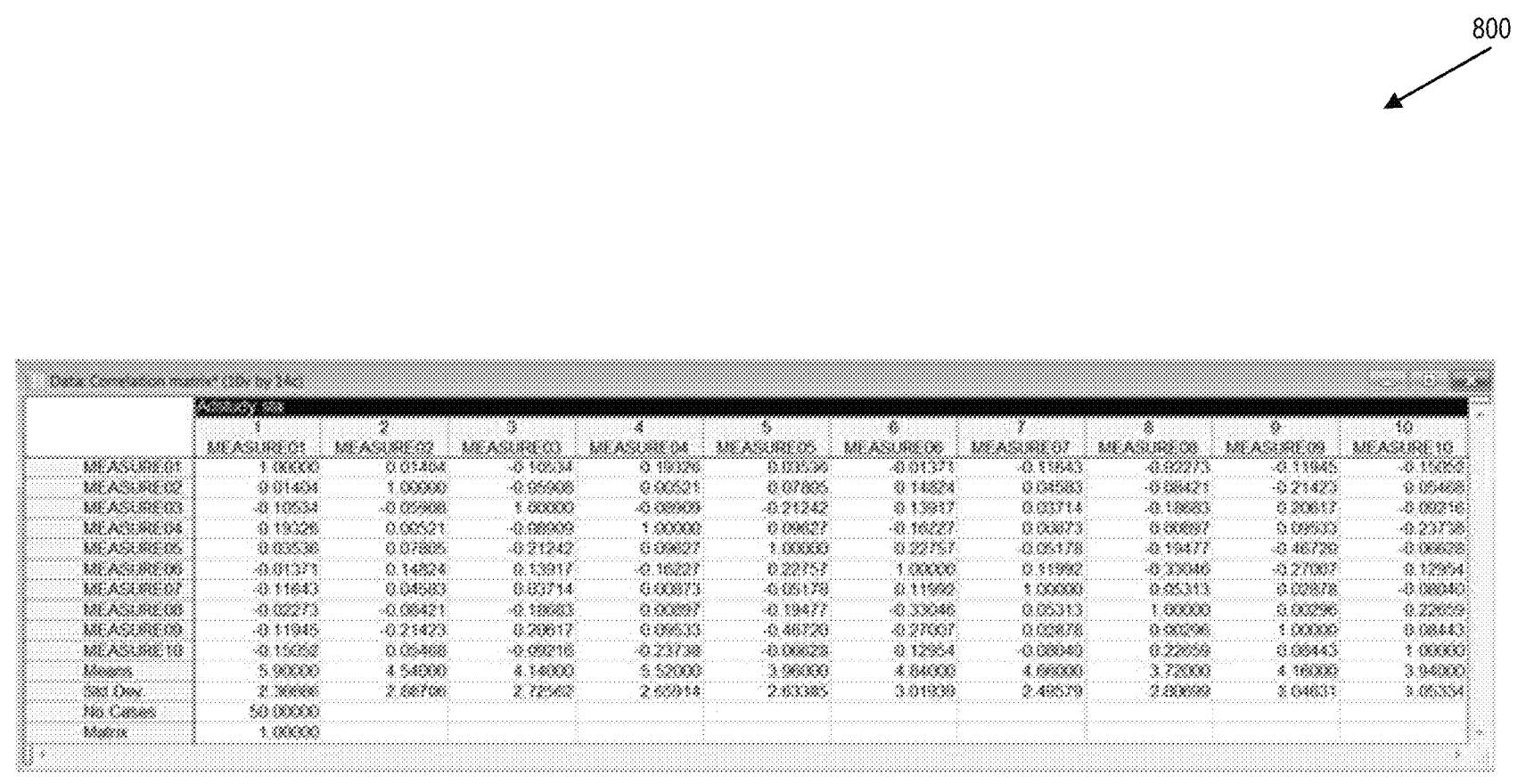

FIG. 8 shows an example correlation matrix 800 as generated by an analytics system. More specifically, when a correlation matrix is computed and extracted from a database (e.g., database 214), the analytics system 220 uses the correlation matrix as an input for multiple regression and proceeds with a multiple regression analysis.

Often, multiple regression estimations are based on correlation matrices calculated in-database such as the correlation matrix 800. The square correlation matrix includes target variable and predictors which are provided to via the user interface. Given the user-selected list of decision variables, the auto-query construction system generates a query to calculate required pairwise correlation in a single run. For example, a pattern for one correlation is as follows.

```
SELECT ((n_sum*yx01_sum-x01_sum*y_sum)/(sqrt(n_sum*x201_sum-
x01_sum*x01_sum)*sqrt(n_sum*y2_sum-y_sum*y_sum))) as r_yx01
FROM (SELECT Sum(1) as n_sum, sum(columny) as y_sum,
sum(columny*columny) as y2_sum, Sum(columny*column1) as
yx01_sum, Sum(column1) as x01_sum, Sum(column1*column1) as
x201_sum FROM [database].[dbo].[datatable]) sub1.
```

The size of the correlation matrix is much smaller than that of the raw data. E.g. the input data may have billions of rows of data and only 10 variables including the target. The size of the correlation matrix is then only 10×(10+1)/2 (often an analysis only need only the upper diagonal). In certain embodiments, a fully qualified correlation matrix for use within a computational system such as the Dell Statistica computation system additionally includes means and standard deviations for all variables as well as the overall number of cases.

Figure 9:
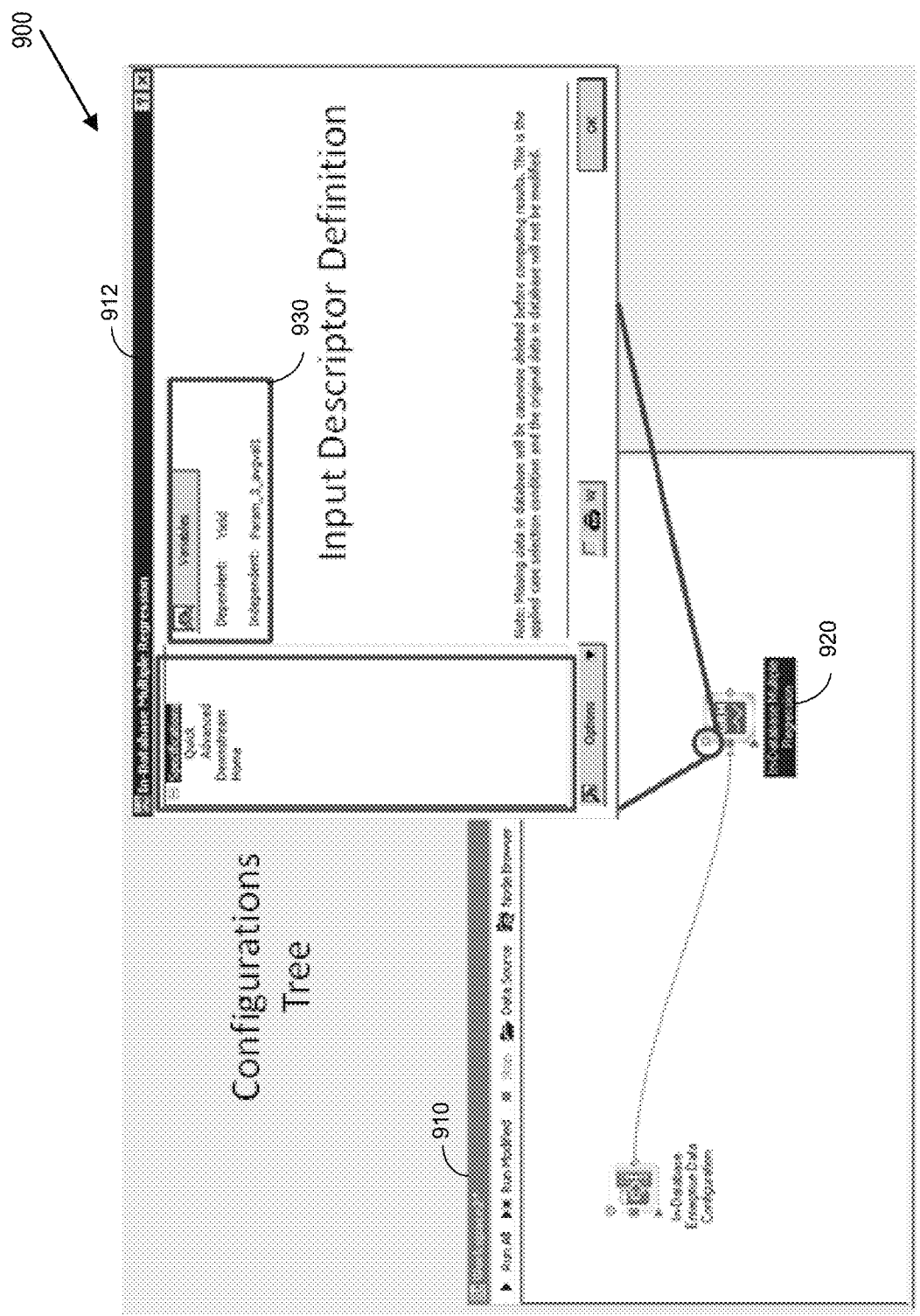
FIG. 9 shows a screen presentation of an example configuration tree user interface.

FIG. 9 shows screen presentations of an example tree control user interface 900 for performing a multiple regression operation. More specifically, the screen presentations include a workspace user interface 910 and a configurations tree user interface 912. When a user actuates a configuration icon 920 within the workspace user interface 910, the auto-query construction system presents the configuration tree user interface 912. The configuration tree user interface 912 includes an input descriptor definition portion 930 via which a user can input variables. While illustrating a generalized user interface for tree control for various configurations related to a particular analysis, the user interface 900 provides an example of a user interface for providing tree control of a multiple regression operation.

In certain embodiments, performing a multiple regression operation is based on iteratively reweighted least squares with Newton-Raphson method for logistic regression. More specifically, when performing such a multiple regression operation, the auto-query construction system performs a plurality of steps.

First, the auto-query construction system prepares a design matrix. When preparing the design matrix, all categorical variables are scanned to determine distinct values. Using this information the distinct values are recoded using sigma-restricted parametrization. The design matrix is stored in a database (e.g., database 214) as a temporary table. For example, in certain embodiments, the data the design matrix will be as shown in FIG. 10. More specifically, FIG. 10 shows the raw data of the design matrix which may be obtained from a management application such as the Microsoft SQL Server management studio.

Next, the auto-query construction system performs iterations over the design matrix. In certain embodiments, the iterations are performed via fitting standard weighted multiple regression to the data according to iteratively reweighted least squares Newton-Raphson method. In certain embodiments, the auto-query construction system performs tests for quasi- and full separation after each iteration.

Next, the auto-query construction system continues performing iterations continue until predefined convergence criteria are satisfied or the number of iterations exceed predefined limit. At this point, the auto-query construction system reports the final coefficient estimates to the user. In certain embodiments at this point all temporary tables are removed.

Figure 11:
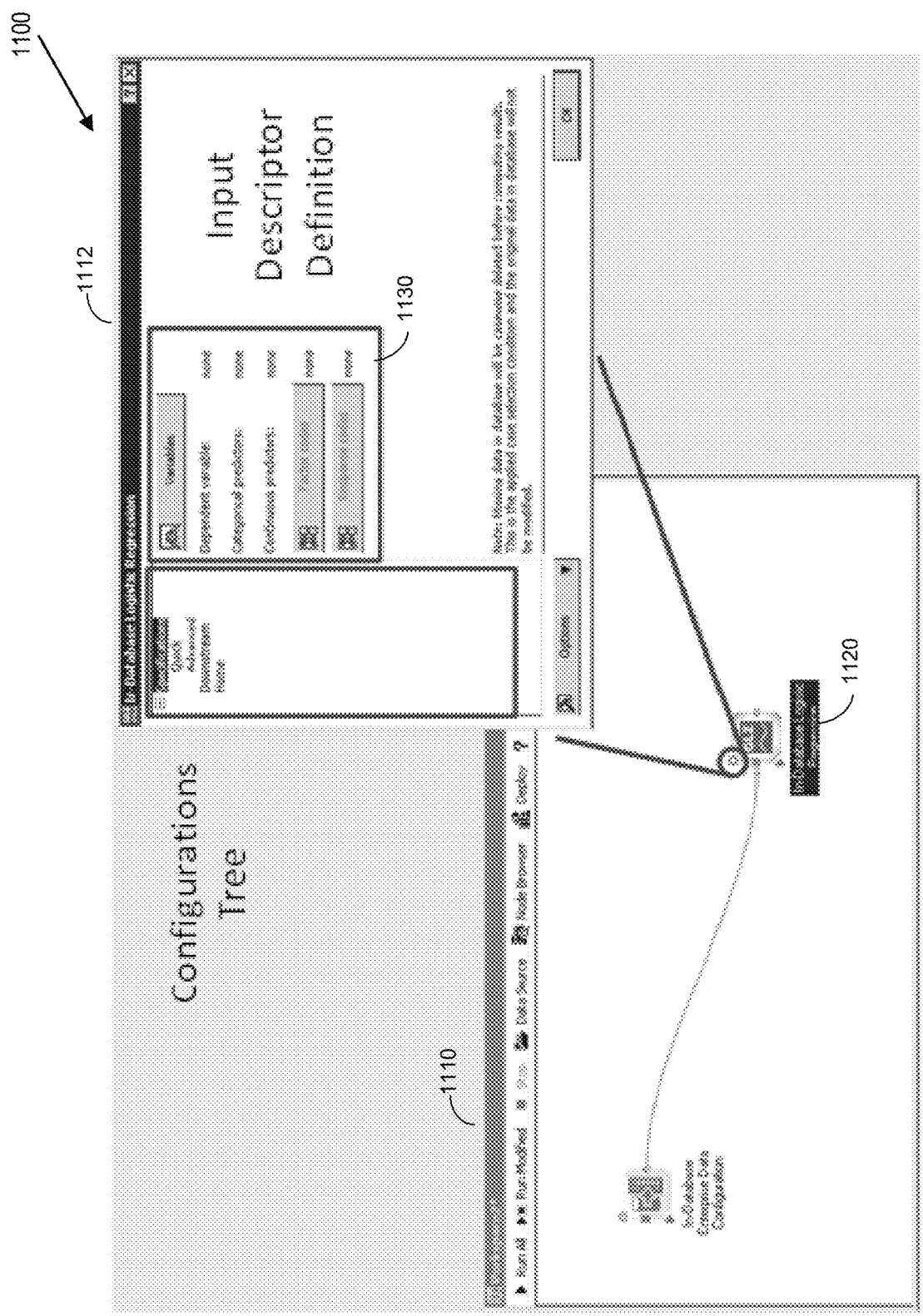
FIG. 11 shows a screen presentation of an example configuration tree user interface.

FIG. 11 shows screen presentations 1100 of an example configuration tree user interface for performing a logistics regression operation. More specifically, the screen presentations include a workspace user interface 1110 and a configurations tree user interface 1112. When a user actuates a configuration icon 1120 within the workspace user interface 1110, the auto-query construction system presents the configuration tree user interface 1112. The configuration tree user interface 1112 includes an input descriptor definition portion 1130 via which a user can input variables.

It will be appreciated that the auto-query construction system can be used to present different patterns, for in-database analytics modules such as cluster analysis, association rules analysis, decision trees and lasso regression.

For example, in certain embodiments, the cluster analysis approach is based on K-means cluster analysis procedure. The user defines the number of clusters beforehand. Initially, cluster centers are initialized at random. The process creates a temporary table in the database (e.g., database 214) to be used for iterations. In addition to original columns two additional columns are added, each to hold the cluster number on the current and previous steps of iterations. Next, observations are assigned a cluster number based on the minimal Euclidean distance from the observation vector to the cluster center. Cluster centers are recomputed based on average vector across all observations constituting the cluster and the clustering results are compared after every iteration. Iterations stop if the results match. There may also be user defined parameter for the maximum number of iterations.

Association rules market basket analysis is based on computing frequencies for separate items in the relation (e.g. A B, meaning if A then B) and frequency of their coexistence. "A" itself can represent a single item or a collection of items. The results for each link are reported with the values of support, confidence and lift.

The probability that a transaction contains a particular code or text value is called Support; the Support value is also computed in consecutive passes through the data, as the joint probability (relative frequency of co-occurrence) of pairs, triplets, etc. of codes or text values (items), i.e., separately for the "A" and "B" of each association rule. This conditional probability (i.e., that an observation (transaction) that contains a code or text value X also contains a code or text value Y) is referred to as the confidence value. The lift is computed based on the values of confidence and support. Decision tree nodes implement algorithms such as CHAID and Classification and Regression (C&RT) trees. The in-database portion of the computations deals with binning of the variables (both categorical and continuous) and performing calculations of the cross-tabulation tables. a cross-tabulation table may be used for one level of the tree, which can contain multiple nodes. The actual splitting criteria may be identified by functions implemented for CHAID and C&RT modules of a computation system such as the Dell Statistica computation system.

Lasso regression is similar with respect to in-database computations of multiple regression. In general, the auto-query construction system computes correlations in-database and retrieves them back to a computation system such as the Dell Statistica computation system where the actual coefficients of the model are computed. Lasso regression is, however, an iterative process, so it would require multiple scans of the data, whereas multiple regression is a single pass algorithm.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing in-database operations, comprising:
presenting an auto-query construction user interface to a user, the auto-query construction user interface enabling a user to provide input variables to an auto-query construction system;
constructing a database query based upon the input variables provided via the auto-query construction user interface within a node of a workspace environment;
instantiating an in-database processing operation in the auto-query construction system within the node of the workspace environment based upon the database query;
converting the instantiation of the in-database processing operation to at least one database statement;

providing the at least one database statement from the auto-query construction system to a storage system configured to perform distributed computations, wherein providing causes the execution of the at least one database statement within the storage system; and, wherein constructing the database query includes accessing the auto-query construction user interface to query for aggregators engine, identifying a statistics analytics task or a predictive analytics task selected by the user via the auto-query construction user interface, and retrieving input descriptor information associated with the input variables for performing the task;

wherein constructing the database query is further based on a target database, query dialect, and at least one of a correlation pattern, regression pattern, cluster pattern, decision tree pattern, and association rules pattern;

wherein converting the in-database operation to the at least one database statement is based, at least in part, on the statistics analytics task or the predictive analytics task selected by the user;

the results from the execution of the at least one database statement comprise aggregate values, the aggregate values being transferred from the storage system to the workspace environment, the workspace environment finalizing parameters for the statistics analytics task or the predictive analytics task based upon the aggregate values.

2. The method of claim 1, further comprising:
distributing the at least one database statement across a plurality of nodes of the storage system; and,
executing the at least one database statement at each of the plurality of nodes of the storage system.

3. The method of claim 1, further comprising:
providing results from the execution of the at least one database statement to the node of the workspace environment.

4. The method of claim 1, wherein:
the predictive modeling algorithm relying entirely on queries to the storage system.

5. The method of claim 4, wherein:
the predictive modeling algorithm comprises data-processing intensive algorithms.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
  presenting an auto-query construction user interface to a user, the auto-query construction user interface enabling a user to provide input variables to an auto-query construction system;
  constructing a database query based upon the input variables provided via the auto-query construction user interface within a node of a workspace environment;
  instantiating an in-database processing operation in the auto-query construction system within the node of the workspace environment based upon the database query;
  converting the instantiation of the in-database processing operation to at least one database statement;
  providing the at least one database statement from the auto-query construction system to a storage system configured to perform distributed computations, wherein providing causes the execution of the at least one database statement within the storage system; and, wherein constructing the database query includes accessing the auto-query construction user interface to query for aggregators engine, identifying a statistics analytics task or a predictive analytics task selected by the user via the auto-query construction user interface, and retrieving input descriptor information associated with the input variables for performing the task;

wherein constructing the database query is further based on a target database, query dialect, and at least one of a correlation pattern, regression pattern, cluster pattern, decision tree pattern, and association rules pattern;

wherein converting the in-database operation to the at least one database statement is based, at least in part, on the statistics analytics task or the predictive analytics task selected by the user;

the results from the execution of the at least one database statement comprise aggregate values, the aggregate values being transferred from the storage system to the workspace environment, the workspace environment finalizing parameters for the statistics analytics task or the predictive analytics task based upon the aggregate values.

7. The system of claim 6, wherein the instructions are further configured for:
distributing the at least one database statement across a plurality of nodes of the storage system; and,
executing the at least one database statement at each of the plurality of nodes of the storage system.

8. The system of claim 6, wherein the instructions are further configured for:
providing results from the execution of the at least one database statement to the node of the workspace environment.

9. The system of claim 6, wherein the predictive modeling algorithm relying entirely on queries to the storage system.

10. The system of claim 9, wherein:
the predictive modeling algorithm comprises data-processing intensive algorithms.

11. A non-transitory, computer-readable storage medium embodying computer program code, the computer program code comprising computer executable instructions configured for:
  presenting an auto-query construction user interface to a user, the auto-query construction user interface enabling a user to provide input variables to an auto-query construction system;
  constructing a database query based upon the input variables provided via the auto-query construction user interface within a node of a workspace environment;
  instantiating an in-database processing operation in the auto-query construction system within the node of the workspace environment based upon the database query;
  converting the instantiation of the in-database processing operation to at least one database statement;
  providing the at least one database statement from the auto-query construction system to a storage system configured to perform distributed computations, wherein providing causes the execution of the at least one database statement within the storage system; and, wherein constructing the database query includes accessing the auto-query construction user interface to query for aggregators engine, identifying a statistics analytics task or a predictive analytics task selected by the user via the auto-query construction user interface, and retrieving input descriptor information associated with the input variables for performing the task;

wherein constructing the database query is further based on a target database, query dialect, and at least one of a correlation pattern, regression pattern, cluster pattern, decision tree pattern, and association rules pattern;

wherein converting the in-database operation to the at least one database statement is based, at least in part, on the statistics analytics task or the predictive analytics task selected by the user;

the results from the execution of the at least one database statement comprise aggregate values, the aggregate values being transferred from the storage system to the workspace environment, the workspace environment finalizing parameters for the statistics analytics task or the predictive analytics task based upon the aggregate values.

12. The non-transitory, computer-readable storage medium of claim 11, wherein the instructions are further configured for:
   distributing the at least one database statement across a plurality of nodes of the storage system; and,
   executing the at least one database statement at each of the plurality of nodes of the storage system.

13. The non-transitory, computer-readable storage medium of claim 12, wherein the instructions are further configured for:
   providing results from the execution of the at least one database statement to the node of the workspace environment.

14. The non-transitory, computer-readable storage medium of claim 11, wherein the predictive modeling algorithm relying entirely on queries to the storage system.

15. The non-transitory, computer-readable storage medium of claim 14, wherein:
   the predictive modeling algorithm comprises data-processing intensive algorithms.

* * * * *